(12) United States Patent
Sata

(10) Patent No.: US 8,996,261 B2
(45) Date of Patent: Mar. 31, 2015

(54) AUTOMOBILE PADDLE SHIFTERS LOCKING DEVICE AND SYSTEM

(71) Applicant: Toyota Motor Engineering & Manufacturing North America, Inc., Erlanger, KY (US)

(72) Inventor: Andrew Sata, Gardena, CA (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 272 days.

(21) Appl. No.: 13/660,961

(22) Filed: Oct. 25, 2012

(65) Prior Publication Data

US 2014/0116179 A1    May 1, 2014

(51) Int. Cl.
*B60W 10/10*    (2012.01)
*B60K 20/06*    (2006.01)

(52) U.S. Cl.
CPC ........... *B60K 20/06* (2013.01); *Y10T 74/20146* (2015.01)
USPC .......................................... 701/51; 74/473.31

(58) Field of Classification Search
USPC .......................................... 701/51; 74/473.31
See application file for complete search history.

(56) References Cited

U.S. PATENT DOCUMENTS

| | | | |
|---|---|---|---|
| RE31,451 E | 11/1983 | Osborn | |
| 4,574,661 A | 3/1986 | Opperud et al. | |
| 5,029,680 A | 7/1991 | Kobayashi et al. | |
| 5,050,079 A | 9/1991 | Steeby | |
| 5,335,743 A | 8/1994 | Gillbrand et al. | |
| 5,425,686 A | 6/1995 | Grange | |
| 5,456,333 A | 10/1995 | Brandt et al. | |
| 6,076,414 A | 6/2000 | Tabata et al. | |
| 6,109,126 A | 8/2000 | Cochran et al. | |
| 6,525,283 B2 | 2/2003 | Leng | |
| 6,555,928 B1 | 4/2003 | Mizuno et al. | |
| 6,773,369 B2 | 8/2004 | Altenkirch et al. | |
| 6,939,266 B2 | 9/2005 | Koerner et al. | |

(Continued)

FOREIGN PATENT DOCUMENTS

| | | |
|---|---|---|
| GB | 2435678 | 9/2007 |
| GB | 2473294 | 3/2011 |

(Continued)

OTHER PUBLICATIONS

"Can Capable Shift Selectors"; www.arrens.com/products/bywireshift/cancapable.cfm; 1 page; May 13, 2012.

(Continued)

*Primary Examiner* — Edwin A Young
(74) *Attorney, Agent, or Firm* — Snell & Wilmer LLP

(57) ABSTRACT

A system for activating and deactivating a gear change in a vehicle. The system including a steering wheel, first and second paddle shifters coupled to the steering wheel or column, a switch having an activate state and a deactivate state and coupled to the steering wheel, a center console, an instrument panel, or an integrated display, and a locking mechanism connected to the first and second paddle shifters to inhibit movement or functioning of the first and second paddle shifters when the switch is in the deactivate state and to allow movement or functioning of the first and second paddle shifters when the switch is in the activate state as a stand-alone lock out method or integrated with an electronic lock out method.

24 Claims, 3 Drawing Sheets

(56) References Cited

U.S. PATENT DOCUMENTS

| | | |
|---|---|---|
| 6,962,552 B2 | 11/2005 | Sakamoto et al. |
| 6,978,691 B2 | 12/2005 | Katakura |
| 7,182,710 B2 | 2/2007 | Surampudi |
| 7,278,510 B1 | 10/2007 | Richards |
| 7,367,420 B1 | 5/2008 | Sherrod et al. |
| 7,470,212 B2 | 12/2008 | Inagaki et al. |
| 7,470,213 B2 | 12/2008 | Matsudaira et al. |
| 7,555,967 B2 | 7/2009 | Terayama et al. |
| 7,563,189 B2 | 7/2009 | Inuta |
| 7,597,021 B2 | 10/2009 | Nishio et al. |
| 7,603,924 B2 | 10/2009 | Mandou et al. |
| 7,678,005 B2 | 3/2010 | Tuckfield |
| 7,704,187 B2 | 4/2010 | Saito et al. |
| 7,717,823 B2 | 5/2010 | Balamucki et al. |
| 7,774,118 B2 | 8/2010 | Hata et al. |
| 7,819,776 B2 | 10/2010 | Toi et al. |
| 7,841,254 B2 | 11/2010 | Ho |
| 7,845,457 B2 | 12/2010 | Baluch et al. |
| 8,021,268 B2 | 9/2011 | Sawada |
| 8,055,414 B2 | 11/2011 | Tawara |
| 8,063,324 B2 | 11/2011 | Sakai et al. |
| 8,133,152 B2 | 3/2012 | Iwao et al. |
| 8,135,521 B2 | 3/2012 | Sugiura et al. |
| 8,186,241 B2 | 5/2012 | Sickart |
| 2007/0293367 A1 | 12/2007 | Trevino et al. |
| 2008/0021609 A1 | 1/2008 | Derby et al. |
| 2008/0182718 A1 | 7/2008 | Ido et al. |
| 2008/0221760 A1 | 9/2008 | Wakamatsu et al. |
| 2009/0200761 A1 | 8/2009 | Stevens |
| 2009/0218160 A1* | 9/2009 | Baluch et al. .............. 180/336 |
| 2009/0270223 A1 | 10/2009 | Cook |
| 2010/0175499 A1 | 7/2010 | Thomas et al. |
| 2010/0305823 A1 | 12/2010 | Kitaori et al. |
| 2011/0005492 A1 | 1/2011 | Takeuchi et al. |
| 2011/0011196 A1 | 1/2011 | Cable |
| 2011/0061488 A1* | 3/2011 | Walters et al. .................. 74/552 |
| 2011/0130928 A1 | 6/2011 | Matsunaga et al. |
| 2011/0132120 A1 | 6/2011 | Skogward |
| 2011/0160969 A1 | 6/2011 | Oguri et al. |
| 2011/0224878 A1 | 9/2011 | Nakamura et al. |
| 2011/0295475 A1 | 12/2011 | Shimizu et al. |
| 2012/0059556 A1 | 3/2012 | Tanaka et al. |
| 2012/0144947 A1 | 6/2012 | Herbert et al. |
| 2012/0204668 A1 | 8/2012 | Zito et al. |
| 2012/0221200 A1* | 8/2012 | Golomb .......................... 701/36 |

FOREIGN PATENT DOCUMENTS

| | | |
|---|---|---|
| JP | 2002254953 | 9/2002 |
| JP | 2003118417 | 4/2003 |
| JP | 2005104423 | 4/2005 |
| JP | 2006022913 | 1/2006 |
| JP | 2007069634 | 3/2007 |
| JP | 2008115975 | 5/2008 |
| JP | 2009192047 | 8/2009 |
| JP | 2010047138 | 3/2010 |
| JP | 2011063260 | 3/2011 |

OTHER PUBLICATIONS

"MasterShift, Paddleshiftng the Future"; mastershif.com/p_street_manual.htm; 2 pages; copyright 2004.

"Shift, Integrated Electronic Safe Shifting System"; www.altronicsinc.com/pages/shift/html; 4 pages; copyright 2011.

"Shrifter Paddle Shifter"; twistmachine.com/shopping; 2 pages; copyright 2012.

Electro-Pneumatic Systems for Formula SAE Application; USC Racing; http: uscracing.wikispaces.com/Electro-Pneumatic+Shifting; 6 pages; printed on Mar. 8, 2013.

Electric Gearshift Actuator; Magneti Marelli S.p.A.; 2 pages; Nov. 2009.

* cited by examiner

AUTOMOBILE PADDLE SHIFTERS LOCKING DEVICE AND SYSTEM

FIELD

The present disclosure relates to paddle shifters, and more particularly, to a locking device or system that is used to lock or disable paddle shifters from operating.

BACKGROUND

Paddle shifters are generally mounted behind or to a steering wheel or a steering column of a vehicle to allow the driver to make a manual single sequential gear shift up or down of the vehicle. Locating the paddle shifters near the steering wheel or the steering column makes it easier for the driver to make manual gear changes without having to take his or her hands off the steering wheel. This increases the driver's control of the vehicle while still allowing the driver to have an enjoyable driving experience.

A paddle shift equipped steering wheel generally has two paddle shifters—one on the right side of the steering wheel and one on the left side of the steering wheel. Each paddle shifter is actuated by either pushing a lever away from or pulling a lever towards the driver. Each paddle shifter is assigned to only one paddle actuation function. That is, depending on the vehicle make and model, one paddle shifter controls a single upshift in gear and one paddle shifter controls a single downshift in gear. In certain instances or situations, the driver may inadvertently misapply the paddle shifters resulting in an unexpected drive force change resulting from an inadvertent gear change.

SUMMARY

The above needs are successfully met via the disclosed systems and methods. The present disclosure relates to paddle shifters, and more particularly, to a locking device or system that is used to lock or disable paddle shifters from operating. In various embodiments, the system activates and deactivates a gear change in a vehicle. The system includes a steering wheel, first and second paddle shifters coupled to the steering wheel or steering column, a switch having an activate state and a deactivate state and coupled to a portion of a vehicle such as a steering wheel, a paddle shifter, a center console, an instrument panel, or an integrated display and/or a locking mechanism. The locking mechanism may be connected to the first and second paddle shifters to inhibit movement or functioning of the first and second paddle shifters when the switch is in the deactivate state and to allow movement and functioning of the first and second paddle shifters when the switch is in the activate state.

BRIEF DESCRIPTION OF THE DRAWINGS

The features and advantages of the embodiments of the present disclosure will become more apparent from the detailed description set forth below when taken in conjunction with the drawings. Naturally, the drawings and their associated descriptions illustrate example arrangements within the scope of the claims and do not limit the scope of the claims. Reference numbers are reused throughout the drawings to indicate correspondence between referenced elements.

DETAILED DESCRIPTION

In the following detailed description, numerous specific details are set forth to provide an understanding of the present disclosure. It will be apparent, however, to one of ordinarily skilled in the art that elements of the present disclosure may be practiced without some of these specific details. In other instances, well-known structures and techniques have not been shown in detail to avoid unnecessarily obscuring the present disclosure.

A semi-automatic transmission (also known as automated transmission, self-changing transmission, clutch-less manual transmission, automated manual transmission, flappy-paddle gearbox, or paddle-shift gearbox) is an automobile transmission that facilitates manual gear changes by dispensing with the need to press a clutch pedal at the same time as changing gears. It may use electronic sensors, pneumatics, processors and actuators to execute gear shifts on the command of the driver and/or by a computer. This removes the need for a clutch pedal which the driver otherwise needs to depress before making a gear change, since the clutch itself is actuated by electronic equipment which can substantially synchronize the timing and torque required to make quick, smooth gear shifts.

The ability to shift gears manually, often via paddle shifters, can also be found on certain automatic transmissions (manumatics such as Tiptronic) and continuous variable transmissions (CVTs) (such as Lineartronic). Various aspects of the present disclosure may be applicable to these automatic transmissions. The transmission system disclosed herein may make automatic gear shifts and/or manual gear shifts.

A sensor, such as a Hall effect sensor, may sense the direction of requested shift, and this input, together with a sensor in the gear box which senses the current speed and gear selected, feeds into a central processing unit. This central processing unit then determines the optimal timing and torque required for a smooth clutch engagement, based on input from these two sensors as well as other factors, such as engine rotation, the electronic stability control, air conditioner and dashboard instruments.

At times, it may be beneficial to restrict the functionality of the paddle shifters. For instance, it may be advantageous to, at least temporarily, disable operation of one or more paddle shifter. This disabling may be electronic, mechanical, or both.

Figure 1:
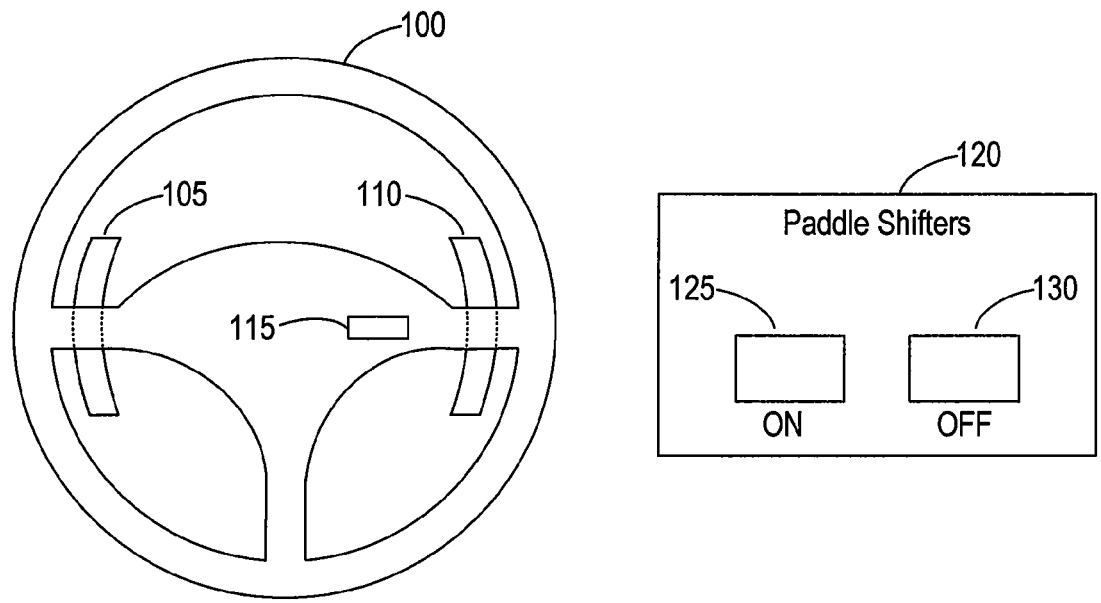
FIG. 1 depicts a partial front view of an automobile steering wheel with paddle shifters and a display console according to various embodiments.

FIG. 1 depicts a partial front view of an automobile steering wheel 100 with paddle shifters 105 and 110 and a display screen 120 according to various embodiments. As shown, a left paddle shifter 105 is attached to or coupled to the steering wheel 100 or column and is used to downshift the vehicle's transmission by one (1) gear per each pull or push of the left paddle shifter 105. Similarly, a right paddle shifter 110 is attached to or coupled to the steering wheel 100 or column and is used to upshift the vehicle's transmission by one (1) gear per each pull or push of the right paddle shifter 110.

According to various embodiments, either right paddle shifter 110 or left paddle shifter 105 may be used to upshift or downshift the vehicle's transmission per each pull or push of each paddle shifter 105 and 110. For instance, a pull on either paddle shifter 105 or 110 may result in a downshift, while a push on ether shifter 105 or 110 may affect an upshift. Conversely, according to various embodiments, a push on either shifter 105 or 110 may result in a downshift, while a pull on either shifter 105 or 110 may result in an upshift.

The paddle shifters 105 and 110 can be mechanically and/or electronically locked to inhibit execution. For example, a switch or button 115 located on the steering wheel 100 (or instrument panel, steering column, steering wheel, paddle shifter 105, 110 or center console) may be used to activate and/or deactivate the paddle shifters 105 and 110. The switch 115 may be a digital switch that can be actuated using the vehicle's information or entertainment system. In response to the switch 115 being depressed or selected, the paddle shifters 105 and 110 are activated and the display screen 120 highlights the ON box 125 with an indicator, such as an illuminated and/or colored indicator (e.g., a green indicator) to indicate that the paddle shifters 105 and 110 are activated. When the switch 115 is depressed again or toggled, the paddle shifters 105 and 110 are deactivated and the display screen 120 highlights the OFF box 130 with an indicator, such as an illuminated and/or colored indicator (e.g., a red indicator) to indicate that the paddle shifters 105 and 110 are deactivated. The driver can also activate the paddle shifters 105 and 110 by touching the ON box 125 and deactivate the paddle shifters 105 and 110 by touching the OFF box 130. Hence, activation and deactivation of the paddle shifters 105 and 110 can be initiated using either or both the switch 115 and/or the display screen 120.

Though a stand-alone switch 115 is depicted, according to various embodiments, electrical disabling/enabling of the paddle shifters 105 and 110 may be achieved through non-standard mechanical use of the paddle shifters 105 and 110 themselves. For instance, moving the paddle shifter 105 or 110 up and/or down in the same plane as the face of the paddle shifter 105 or 110 may effect a disabling/enabling of the paddle shifters 105 and 110. According to various embodiments, a paddle shifter may be configured to pivot in an arching motion relative to a stationary steering column. Moving the paddle shifters 105 and 110 along this pivot may effect a disabling/enabling of the paddle shifters 105 and 110. According to various embodiments, twisting a portion of the paddle shifter 105 and 110 clockwise or counter clockwise may effect a disabling/enabling of the paddle shifters 105 and 110. According to various embodiments, pushing and/or pulling both paddle shifters 105 and 110 substantially simultaneously when the vehicle is in a park position may effect a disabling/enabling of the paddle shifters 105 and 110. According to various embodiments, pushing either paddle shifter 105 and 110 substantially simultaneously with pushing the other paddle shifter 105 and 110 may effect a disabling/enabling of the paddle shifters 105 and 110. According to various embodiments, pushing and/or pulling one or both of the paddle shifters 105 and 110 and holding in the pushed or pulled position for a predetermined time period may effect a disabling/enabling of the paddle shifters 105 and 110. For instance, this time period may be a few seconds. In an exemplary embodiment, pushing the left paddle shifter 105 and holding it for 3 seconds will not only result in a temporarily disabling of both paddle shifters 105 and 110 but will also not result in a gear change from the initial pushing of the paddle shifter 105.

According to various embodiments, moving the paddle shifter 105 or 110 to a second position deeper than a first position, such as by pushing the paddle shifters 105 and 110 to a second position may result in disabling/enabling of the paddle shifters 105 and 110. The paddle shifters 105 and 110 may automatically return to their initial default position after being moved to the second deeper position. In this embodiment, the paddle shifters 105 and 110 may remain in the second position until physically pulled forward (or electronically commanded to return) back to their initial default position. In this way, the paddle shifters 105 and 110 are physically removed and their deeper positioning is an additional visual indicator that they have been disabled and are not available for use prior to being returned to their home default position.

According to various embodiments, moving the face of paddle shifter 105 and 110 to a second position, such as by folding paddle shifters 105 and 110 back towards the steering column, such as by pivoting a portion of the paddle shifters 105 and 110 back in the same plane as the axis of the steering column may result in disabling/enabling of the paddle shifters 105 and 110. The paddle shifters 105 and 110 may remain in this second position until physically unfolding the paddle shifter 105 and 110 (or electronically commanding the paddle shifter 105 and 110 to return) back to their initial default position. In this way, the paddle shifters 105 and 110 are physically removed and their folded positioning is an additional visual indicator that they have been disabled and are not available for use prior to being return to their home default position.

According to various embodiments, the stand-alone switch 115 is a virtual switch. This virtual switch may be displayed on a user interface, such as a graphical user interface. Additional functionality may be registered via this user interface. For instance, the selection of the duration of the temporarily disabling of the paddle shifters may be controlled.

According to various embodiments, the duration of the disabling of the paddle shifters 105 and 110 may vary and/or be selectable. For instance, the paddle shifters 105 and 110 may default as being enabled at each start of the vehicle.

According to various embodiments, the system 100 may retain the last instruction irrespective of turning on or off of the vehicles engine/motor. Thus, according to this embodiment, the disabled paddle shifters 105 and 110 may remain disabled through one or more vehicle starts, such as over a period of days. According to various embodiments, the paddle shifters 105 and 110 may be automatically enabled after a change of the vehicle's gear from neutral and/or reverse. According to various embodiments, the paddle shifters 105 and 110 may be automatically enabled after a predetermined time period such as a span of seconds, minutes and/or hours. The switch 115 may allow for toggling between any of the modes of operation disclosed herein. For instance, the switch 115 may comprise a knob and/or indicator to select a desired electrical disabling period mode of operation.

Figure 2:
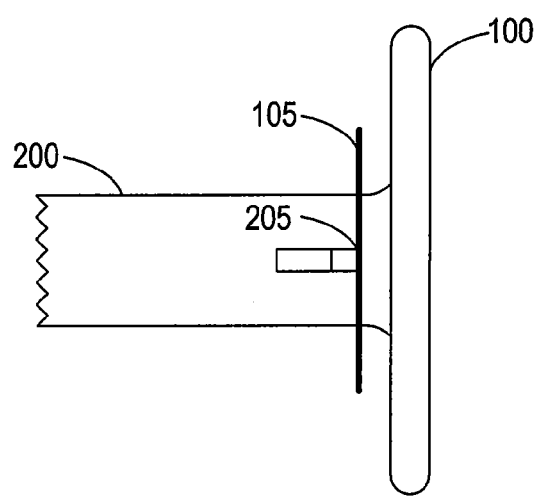
FIG. 2 depicts a left side view of the automobile steering wheel of FIG. 1 showing the left paddle shifter, a steering column, and a locking mechanism according to various embodiments.

FIG. 2 depicts a left side view of the automobile steering wheel 100 of FIG. 1 showing the left paddle shifter 105, a steering column 200, and a locking mechanism 205 according to various embodiments. Referring to FIGS. 1 and 2, in addition to the switch 115 or the OFF box 130 being pushed or selected indicating that the paddle shifters 105 and 110 should be deactivated or turned off or as a standalone system, the locking mechanism 205 may be used to mechanically inhibit or prevent the paddle shifters 105 and 110 from moving. In one embodiment, the locking mechanism 205 may be a clamp, lock or lever, which moves around and/or secures a portion of the paddle shifter 105 and/or the paddle shifter 110 to prevent movement of the paddle shifter 105. The locking mechanism 205 mechanically locks the paddle shifters 105 and 110 into place to allow little to no movement. In another embodiment, two locking mechanisms 205 can be used, one for each paddle shifter 105 and 110.

For example, the paddle shifters 105 and 110 may be mechanically locked at a mounting point (e.g., the steering wheel 100 or the steering column 200) and back and forth movement is restricted. The paddle shifters 105 and 110 may be electronically locked such that each paddle shifter may be moved back and forth but no operation (i.e., gear shift) will be executed due to the lock out (deactivated state). Lock out defines a state in the software executed by a processor or an electronic control unit (ECU) to inhibit execution of the gear shifting operation. For instance, in response to the paddle shifters being locked out, electrically and/or mechanically, moving the paddle shifters 105 and 110 back and forth may result in no change to the gear of the vehicle. Furthermore, in response to pushing or pulling the paddle shifters 105 and 110 while paddle shifter 105 and 110 are locked out may result in an audio warning and/or visual warning such as an indication on screen 120 being communicated. In an example, the red light illuminating box 130 may flash in response to pushing or pulling the paddle shifters 105 and 110 while the paddle shifters 105 and 110 are locked out. In an example, pushing or pulling the paddle shifters 105 and 110 while the paddle shifters 105 and 110 are locked out results in a feedback from a haptic response system, such as vibration of the paddle shifters 105 and 110 to communicate to a user that the paddle shifters 105 and 110 are locked out. The paddle shifters 105 and 110 may be locked out at any time, while the vehicle is in any driving state and/or mode or any parked state or mode.

According to various embodiments, if, after pushing or pulling on paddle shifters 105 and 110 while the paddle shifters 105 and 110 are locked out, a user electronically toggles the operation of the paddle shifters 105 and 110 to an activated state, such as via the switch 115, within a predetermined time period, such as a short period of a few seconds, the command, (e.g., the push or pull of the paddle shifters 105 and 110 while the paddle shifters 105 and 110 were locked out) may be carried out and a change of gear may result. Stated another way, the system 100 may store a received command while the paddle shifters 105 and 110 are locked out for later execution if the paddle shifters 105 and 110 are enabled within a predetermined time period.

According to various embodiments, either the locking mechanism 205 being positioned in the locked position or the switch 115 being toggled to the off position may result in display screen 120 highlighting the OFF box 130 with an indicator. Both the locking mechanism 205 moved to a disengaged location and the switch 115 toggled to the on position may achieve activation of the paddle shifters 105 and 110, resulting in illumination of the ON box 125 on the display screen 120.

Figure 3:
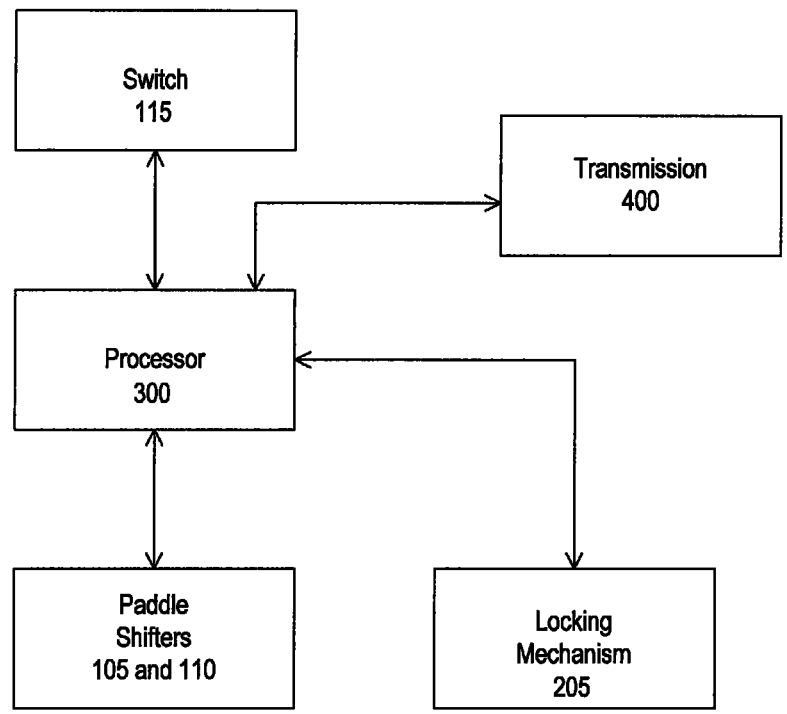
FIG. 3 depicts a simplified block diagram showing the connections of a paddle shifter locking system according to various embodiments.

FIG. 3 depicts a simplified block diagram showing the connections of a paddle shifter locking system according to various embodiments. The system includes the switch 115, a processor 300, a transmission 400, the paddle shifters 105 and 110, and the locking mechanism 205. In one embodiment, the locking mechanism 205 may be directly mechanically connected to the paddle shifters 105 and 110.

Figure 4:
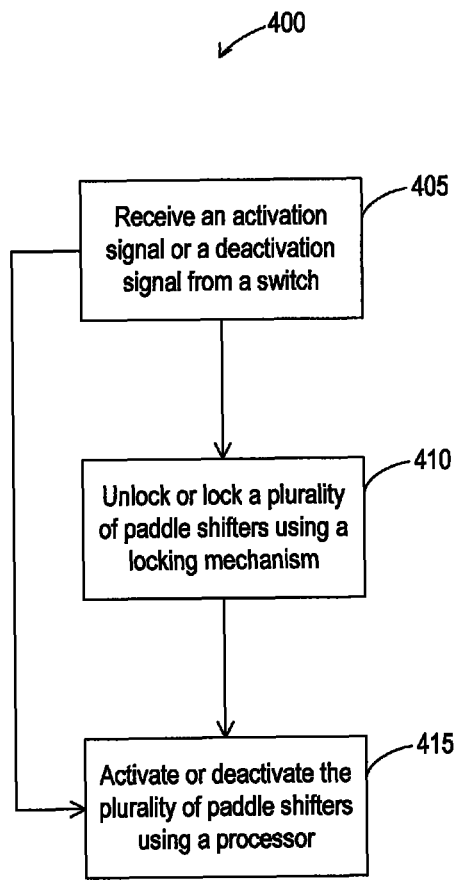
FIG. 4 depicts a flow chart showing a method of activating and deactivating two or more paddle shifters according to various embodiments.

FIG. 4 depicts a flow chart showing a method of activating and deactivating two or more paddle shifters 105 and 110 according to various embodiments. At step 405, the processor 300 receives an activation signal or a deactivation signal from the switch 115. The processor 300 provides instructions to the locking mechanism 205 to engage or lock the paddle shifters 105 and 110 when receiving the deactivation signal and provides instructions to the locking mechanism 205 to disengage or unlock the paddle shifters 105 and 110 when receiving the activation signal (step 410). In addition or as an alternative, the processor 300 instructs the vehicle's electronic control unit (e.g., 300) to activate the paddle shifters 105 and 110 when receiving the activation signal and deactivate the paddle shifters 105 and 110 when receiving the deactivation signal (step 415). Therefore, even though the paddle shifters 105 and 110 are physically capable of moving, the processor 300 electronically controls (i.e., deactivates and activates) the operations of the paddle shifters 105 and 110 even without the locking mechanism 205 physically inhibiting movement of the paddle shifters 105 and 110. The electronic control by the processor 300 of the paddle shifters 105 and 110 provides an additional safety features should the locking mechanism 205 becomes inoperable, non-functioning or misused by the driver or may be utilized as a standalone disabling method.

Those of ordinary skill will appreciate that the various illustrative logical blocks and process steps described in connection with the examples disclosed herein may be implemented as electronic hardware, computer software, or combinations of both. Whether such functionality is implemented as hardware or software depends upon the particular application and design constraints imposed on the overall system. Ordinarily skilled artisans may implement the described functionality in varying ways for each particular application, but such implementation decisions should not be interpreted as causing a departure from the scope of the disclosed apparatus and methods.

Systems, methods and computer program products are provided. References to "various embodiments", in "some embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, a first and/or second paddle shifter coupled to the steering column contemplates the first and/or second paddle shifter being coupled through the steering wheel also coupled to the steering column is contemplated by the system.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The storage medium may be integral to the processor. The computational steps disclosed herein may be comprised in an article of manufacture including a non-transitory, tangible computer readable storage medium having instructions stored thereon.

The foregoing description of the disclosed example embodiments is provided to enable any person of ordinary skill in the art to make or use the present invention. Various modifications to these examples will be readily apparent to those of ordinary skill in the art, and the principles disclosed herein may be applied to other examples without departing from the spirit or scope of the present invention. The described embodiments are to be considered in all respects only as illustrative and not restrictive and the scope of the invention is, therefore, indicated by the following claims rather than by the foregoing description. All changes which come within the meaning and range of equivalency of the claims are to be embraced within their scope.

What is claimed is:

1. A system for activating and deactivating a gear change in a vehicle, the system comprising:
 a steering wheel;
 a first paddle shifter and a second paddle shifter coupled to the steering wheel;
 a switch having an activate state configured to enable operation of the first paddle shifter and the second paddle shifter and a deactivate state configured to disable operation of the first paddle shifter and the second paddle shifter; and
 a display configured to display an indication that the operation of the first paddle shifter and the second paddle shifter is disabled when the switch is in the deactivate state.

2. The system of claim 1, further comprising a locking mechanism coupled to at least one of the first paddle shifter and the second paddle shifter and configured to inhibit movement of the first paddle shifter and the second paddle shifter.

3. The system of claim 1, wherein a warning is generated in response to at least one of a push or a pull of at least one of the first paddle shifter or the second paddle shifter when the switch is in the deactivate state.

4. The system of claim 3, wherein the warning is at least one of visual, audio or haptic.

5. The system of claim 1, wherein the switch is an electrical switch and wherein movement of the first paddle shifter and the second paddle shifter toggles the switch between the activate state and the deactivate state.

6. The system of claim 5, wherein the movement of the first paddle shifter and the second paddle shifter is to a second position that is deeper or closer to the steering wheel than a first position.

7. The system of claim 5, wherein the movement is at least one of both the first paddle shifter and the second paddle shifter pushed together, both the first paddle shifter and the second paddle shifter pulled together, a movement by at least one of the first paddle shifter or the second paddle shifter upwards relative to the plane of the face of paddle shifter, a movement by at least one of the first paddle shifter or the second paddle shifter downwards relative to the plane of the face of paddle shifter, or a twisting movement by at least one of the first paddle shifter or the second paddle shifter.

8. The system of claim 1, wherein the switch is a physical switch located on at least one of a steering column, the steering wheel, the first paddle shifter, the second paddle shifter, a center console, or an instrument panel.

9. The system of claim 1, wherein the switch is a virtual switch displayed on a graphical user interface.

10. The system of claim 1, wherein pushing or pulling the first paddle shifter or the second paddle shifter when the switch is in the deactivated state results in no gear change of the vehicle's transmission.

11. The system of claim 1, wherein the deactivate state is reset to an activate state through at least one of toggling the switch, a timer expiring, turning off the vehicle, turning on the vehicle, placing the vehicle in reverse, or placing the vehicle in neutral.

12. A method for deactivating a paddle shifter gear change in a vehicle, the method comprising:
 toggling a switch having an activate state configured to enable operation of a first paddle shifter and a second paddle shifter and a deactivate state configured to disable operation of the first paddle shifter and the second paddle shifter; and
 engaging a locking mechanism coupled to at least one of the first paddle shifter or the second paddle shifter to inhibit movement of the first paddle shifter and the second paddle shifter.

13. The method of claim 12, further comprising displaying, via a display, an indication of at least one of the activate state or the deactivate. state of the switch.

14. The method of claim 12, further comprising enacting a warning in response to at least one of pushing or pulling at least one of the first paddle shifter or the second paddle shifter when the switch is in the deactivate state.

15. The method of claim 14, wherein the warning is at least one of visual, audio or haptic.

16. The method of claim 12, wherein the switch is an electrical switch and wherein movement of the first paddle shifter and the second paddle shifter toggles the switch and operation of the first paddle shifter and the second paddle shifter between the activate state and the deactivate state.

17. The method of claim 16, wherein the movement of the first paddle shifter and the second paddle shifter is at least one of a positioning of a detent mechanism to a second position that is deeper or closer to a steering wheel than a first position of the detent mechanism.

18. The method of claim 16, wherein the movement is at least one of both the first paddle shifter and the second paddle shifter pushed together, both the first paddle shifter and the second paddle shifter pulled together, a movement by at least one of the first paddle shifter or the second paddle shifter upwards relative to the plane of the face of paddle shifter, a movement by at least one of the first paddle shifter or the second paddle shifter downwards relative to the plane of the face of the paddle shifter, or a twisting movement by at least one of the first paddle shifter or the second paddle shifter.

19. The method of claim 12, wherein the switch is a physical switch located on at least one of a steering column, a steering wheel, the first paddle shifter, the second paddle shifter, a center console, or an instrument panel, 20. The method of claim 12, wherein the switch is a virtual switch displayed on a graphical user interface, 21. The method of claim 12, wherein the deactivate state is reset to an activate state through at least one of toggling the switch, a timer expiring, turning off the vehicle, turning on the vehicle, placing the vehicle in reverse, or placing the vehicle in neutral or park.

22. A system for activating and deactivating a gear change in a vehicle, the system comprising:
 a steering wheel;
 a first paddle shifter and a second paddle shifter coupled to the steering wheel;
 a switch having an activate state configured to enable operation of the first paddle shifter and the second paddle shifter and a deactivate state configured to disable operation of the first paddle shifter and the second paddle shifter; and a locking mechanism coupled to at least one of the first paddle shifter or the second paddle shifter and configured to inhibit movement of the first paddle shifter or the second paddle shifter.

23. A system for activating and deactivating a gear change in a vehicle, the system comprising:

a steering wheel;

a first paddle shifter and a second paddle shifter coupled to the steering wheel; and a switch having an activate state configured to enable operation of the first paddle shifter and the second paddle shifter and a deactivate state configured to disable operation of the first paddle shifter and the second paddle shifter, wherein a warning is generated in response to at least one of a push or a pull of at least one of the first paddle shifter or the second paddle shifter when the s itch is in the deactivated state.

24. The system of claim 23, wherein the warning is at least one of visual, audio or haptic.

* * * * *